(12) United States Patent
Ding et al.

(10) Patent No.: US 7,829,614 B2
(45) Date of Patent: Nov. 9, 2010

(54) REINFORCED POLYESTER COMPOSITIONS, METHODS OF MANUFACTURE, AND ARTICLES THEREOF

(75) Inventors: Tianhua Ding, Evansville, IN (US); Sung Dug Kim, Newburgh, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/346,064

(22) Filed: Dec. 30, 2008

(65) Prior Publication Data

US 2010/0168289 A1 Jul. 1, 2010

(51) Int. Cl.
| C08K 3/40 | (2006.01) |
| C08K 5/02 | (2006.01) |
| C08K 5/3492 | (2006.01) |
| C08K 5/53 | (2006.01) |
| C08K 5/5313 | (2006.01) |

(52) U.S. Cl. .................. 524/126; 524/100; 524/133; 524/135; 524/464; 524/494

(58) Field of Classification Search ............... 524/100, 524/126, 133, 135, 494, 464
See application file for complete search history.

(56) References Cited

U.S. PATENT DOCUMENTS

| | | | |
|---|---|---|---|
| 2,130,948 A | 9/1938 | Carothers |
| 2,241,322 A | 5/1941 | Hanford |
| 2,312,966 A | 3/1943 | Hanford |
| 2,465,319 A | 3/1949 | Whinfield |
| 2,512,606 A | 6/1950 | Bolton et al. |
| 3,047,539 A | 7/1962 | Pengilly |
| 3,078,254 A | 2/1963 | Zelinski |
| 3,265,765 A | 8/1966 | Holden et al. |
| 3,297,793 A | 1/1967 | Dollinger |
| 3,302,243 A | 2/1967 | Ludwig |
| 3,402,159 A | 9/1968 | Hsieh |
| 3,405,198 A | 10/1968 | Rein et al. |
| 3,594,452 A | 7/1971 | De La Mare et al. |
| 3,671,487 A | 6/1972 | Abolins |
| 3,769,260 A | 10/1973 | Segal |
| 3,864,428 A | 2/1975 | Nakamura et al. |
| 3,915,608 A | 10/1975 | Hujik |
| 3,953,404 A | 4/1976 | Borman |
| 4,096,156 A | 6/1978 | Freudenberger et al. |
| 4,119,607 A | 10/1978 | Gergen et al. |
| 4,128,526 A | 12/1978 | Borman |
| 4,154,775 A | 5/1979 | Axelrod |
| 4,172,859 A | 10/1979 | Epstein |
| 4,180,494 A | 12/1979 | Fromuth et al. |
| 4,254,011 A | 3/1981 | Bier |
| 4,264,487 A | 4/1981 | Fromuth et al. |
| 4,292,233 A | 9/1981 | Binsack et al. |
| 4,506,043 A | 3/1985 | Ogawa et al. |
| 4,940,745 A | 7/1990 | Lausberg et al. |
| 4,954,540 A | 9/1990 | Nakane et al. |
| 4,983,660 A | 1/1991 | Youshida |
| 5,162,424 A | 11/1992 | de Boer et al. |
| 5,221,704 A | 6/1993 | Shimotsuma et al. |
| 5,266,601 A | 11/1993 | Kyber et al. |
| 5,302,645 A | 4/1994 | Nakano et al. |
| 5,326,806 A | 7/1994 | Yokoshima et al. |
| 5,385,970 A | 1/1995 | Gallucci et al. |
| 5,684,071 A | 11/1997 | Mogami et al. |
| 5,955,565 A | 9/1999 | Morris et al. |
| 6,013,707 A | 1/2000 | Kleiner et al. |
| 6,068,935 A | 5/2000 | Hayami et al. |
| 6,111,031 A | 8/2000 | Puyenbroek et al. |
| 6,166,114 A | 12/2000 | Cosstick et al. |
| 6,255,371 B1 | 7/2001 | Schlosser et al. |
| 6,420,459 B1 | 7/2002 | Horold |
| 6,429,243 B1 | 8/2002 | Okamoto |

(Continued)

FOREIGN PATENT DOCUMENTS

DE        19904814 A1       8/2000

(Continued)

OTHER PUBLICATIONS

ASTM Designation: D790-03, "Standard Test Methods for Flexural Properties of Unreinforced and Reinforced Plastics and Electrical Insulating Materials," pp. 1-11 (2003).
International Standard: ISO 11443, "Plastics—Determination of the Fluidity of Plastics Using Capillary and Slit-die Rheometers," pp. 1-34 (2005).
UL 94, "Tests for Flammability of Plastic Materials for Parts in Devices and Appliances," 52 pgs. (1996-2003).
Cooper, et al., "Life Cycle Engineering Guidelines," pp. 1-92 (2001).
ASTM Designation: D256-06, Standard Test Methods for Determining the Izod Pendulum Impact Resistance of Plastics, pp. 1-20 (2006).

(Continued)

*Primary Examiner*—Kriellion A Sanders
(74) *Attorney, Agent, or Firm*—Cantor Colburn LLP; Diderico van Eyl

(57) ABSTRACT

A composition comprises, based on the total weight of the composition: from 20 to 90 wt. % of a polyester component comprising a poly(butylene terephthalate); from 5 to 35 wt. % of a flame retardant phosphinate of the formula (I)

$$[(R^1)(R^2)(PO)-O]^-_m M^{m+} \quad (I)$$

a flame retardant diphosphinate of the formula (II)

$$[(O-POR^1)(R^3)(POR^2-O)]^{2-}_n M^{m+}_x \quad (II),$$

and/or a flame retardant polymer derived from the flame retardant phosphinate of the formula (I) or the flame retardant diphosphinate of the formula (II); from 1 to 25 wt. % of a melamine polyphosphate, melamine cyanurate, melamine pyrophosphate, and/or melamine phosphate; from greater than zero to 50 wt. % of a glass fiber having a non-circular cross-section; and from 0 to 5 wt. % of an additive selected from the group consisting of a mold release agent, an antioxidant, a thermal stabilizer, an antioxidant, and a UV stabilizer; wherein the components have a combined total weight of 100 wt. %.

37 Claims, No Drawings

U.S. PATENT DOCUMENTS

| | | | |
|---|---|---|---|
| 6,444,283 | B1 | 9/2002 | Turner et al. |
| 6,469,095 | B1 | 10/2002 | Gareiss et al. |
| 6,503,988 | B1 | 1/2003 | Kitahara |
| 6,531,530 | B2 | 3/2003 | Asano |
| 6,538,054 | B1 | 3/2003 | Klatt et al. |
| 6,547,992 | B1 | 4/2003 | Schlosser |
| 6,569,928 | B1 | 5/2003 | Levchik et al. |
| 7,105,589 | B2 * | 9/2006 | Geprags ............ 524/90 |
| 7,498,368 | B2 | 3/2009 | Harashina et al. |
| 2001/0007888 | A1 | 7/2001 | Asano |
| 2001/0009944 | A1 | 7/2001 | Chisolm et al. |
| 2002/0096669 | A1 | 7/2002 | Van Der Spek et al. |
| 2002/0123566 | A1 | 9/2002 | Georgiev et al. |
| 2002/0134771 | A1 | 9/2002 | Wenger et al. |
| 2003/0018107 | A1 | 1/2003 | Heinen et al. |
| 2004/0192812 | A1 | 9/2004 | Engelmann et al. |
| 2005/0038145 | A1 | 2/2005 | Gallucci et al. |
| 2005/0137297 | A1 | 6/2005 | De Wit |
| 2005/0137300 | A1 | 6/2005 | Schlosser et al. |
| 2005/0143503 | A1 | 6/2005 | Bauer et al. |
| 2005/0154099 | A1 | 7/2005 | Kobayashi et al. |
| 2005/0272839 | A1 * | 12/2005 | Bauer et al. ............ 524/115 |
| 2006/0084734 | A1 | 4/2006 | Bauer et al. |
| 2006/0247339 | A1 | 11/2006 | Harashina et al. |
| 2007/0049667 | A1 | 3/2007 | Kim et al. |
| 2007/0161725 | A1 | 7/2007 | Janssen |
| 2007/0179234 | A1 | 8/2007 | Choate, Jr. et al. |
| 2008/0090950 | A1 | 4/2008 | Costanzi et al. |
| 2008/0139711 | A1 | 6/2008 | Borade et al. |
| 2008/0242789 | A1 | 10/2008 | Zhu et al. |
| 2008/0269383 | A1 | 10/2008 | Pauquet et al. |
| 2009/0124733 | A1 | 5/2009 | Haruhara et al. |
| 2009/0203871 | A1 | 8/2009 | Maruyama et al. |

FOREIGN PATENT DOCUMENTS

| | | |
|---|---|---|
| EP | 0146104 A2 | 6/1985 |
| EP | 0400935 A2 | 12/1990 |
| EP | 0672717 A1 | 9/1995 |
| EP | 0919591 A1 | 6/1999 |
| EP | 1967549 A1 | 6/2008 |
| JP | 04-345655 | 1/1992 |
| WO | 9902606 A1 | 1/1999 |
| WO | 9965987 A1 | 12/1999 |
| WO | 0121698 A1 | 3/2001 |
| WO | 01/81470 A1 | 11/2001 |
| WO | 2005/059018 A1 | 6/2005 |
| WO | 2007/084538 A2 | 7/2007 |
| WO | 2008/011940 A1 | 1/2008 |
| WO | 2008/014254 A2 | 1/2008 |
| WO | 2008/014273 A1 | 1/2008 |

OTHER PUBLICATIONS

ASTM Designation: D648-06, Standard Test Method for Deflection Temperature of Plastics Under Flexural Load in the Edgewise Position, pp. 1-13 (2006).

Cooper et al., Life Cycle Engineering Guidelines, EPA 600/R-01/101, Risk Management Research, pp. 1-100 (2001).

International Standard: ISO 180, Plastics—Determination of Izod Impact Strength, pp. 1-16 (2000).

International Standard: ISO 527-1, Plastics—Determination of Tensile Properties, pp. 1-54 (1993).

International Searching Authority, International Search Report, PCT/US2009/069127, Date of mailing: Mar. 17, 2010, 7 pages.

The International Searching Authority, International Search Report and Written Opinion, PCT/US2008/066599, Mailing date: Mar. 2, 2009, 7 pages.

The International Searching Authority, International Search Report, PCT/US2008/066603, Date of mailing Dec. 23, 2009, 7 pgs.

The International Searching Authority, International Search Report and Written Opinion, PCT/US2004/042202, Date of mailing: Mar. 9, 2005, 12 pages.

The International Searching Authority, International Search Report and Written Opinion, PCT/US2009/069128, Date of mailing Mar. 17, 2010, 16 pages.

UL 94, Tests for Flammability of Plastic Materials for Parts in Devices and Appliances, 52 pgs (Dec. 12, 2003).

ASTM Designation: D 256-06, "Standard Test Methods for Determining the Izod Pendulum Impact Resistance of Plastics," pp. 1-20 (2006).

ASTM Designation: D 648-06, "Standard Test Method for Deflection Temperature of Plastics Under Flexural Load in the Edgewise Position," pp. 1-13 (2006).

* cited by examiner

REINFORCED POLYESTER COMPOSITIONS, METHODS OF MANUFACTURE, AND ARTICLES THEREOF

BACKGROUND

This disclosure relates to reinforced polyester compositions, method of manufacture, and articles thereof.

Thermoplastic polyester compositions, such as poly(alkylene terephthalates), have valuable characteristics including strength, toughness, high gloss, and solvent resistance. Polyesters therefore have utility as materials for a wide range of applications, from automotive parts to electric and electronic appliances. Because of their wide use, particularly in electronic applications, it is desirable to provide flame retardance to polyesters.

Numerous flame retardants (FR) for polyesters are known, but many contain halogens, usually chlorine and/or bromine Halogenated flame retardant agents are less desirable because of the increasing demand for ecologically friendly ingredients. Halogen-free flame retardants, such as phosphorus- and nitrogen-based compounds can be used as well. There is a need to improve the flame retardance of thin sections of molded compositions containing such flame retardants.

More ecologically compatible flame retardant (eco-FR) formulations based on aluminum salts of phosphinic or diphosphinic acid compounds and melamine compounds have been developed to overcome environmental issues of halogenated flame retardants. Another benefit of the eco-FR formulations is high comparative tracking index (CTI) compared to halogenated FR. CTI is a measure of the electrical breakdown on the surface of an insulating material. To measure the tracking, 50 drops of 0.1% ammonium chloride solution are dropped on the material, and the voltage measured for a 3 mm thickness. A large voltage difference gradually creates a conductive leakage path across the surface of the material by forming a carbonized track. Materials having a higher CTI require a higher voltage to generate a conductive leakage path.

However, the eco-FR formulations also possess undesirable mechanical properties, including reduced impact strength and tensile strength, as well as undesirable flow properties compared to the halogenated flame retardant compositions. The addition of small amounts of a polyetherimide (PEI), in particular ULTEM 1010, can boost mechanical properties of the eco-FR formulations, although with the drawback of lowering CTI (compared to eco-FR formulations without PEI. It is believed that PEI tends to form chars, reducing CTI.

Thus, an ongoing need exists for polyester compositions having the combination of high comparative tracking index and good flame retardant properties at thicknesses of 0.8 mm or less, while at least essentially maintaining, dimensional stability, mechanical properties and/or heat properties.

BRIEF SUMMARY OF THE INVENTION

A composition comprises, based on the total weight of the composition: from 20 to 90 wt. % of a polyester component comprising a poly(butylene terephthalate); from 5 to 35 wt. % of a flame retardant phosphinate of the formula (I)

a flame retardant diphosphinate of the formula (II)

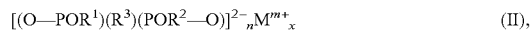

and/or a flame retardant polymer derived from the flame retardant phosphinate of the formula (I) or the flame retardant diphosphinate of the formula (II), wherein $R^1$ and $R^2$ wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or boron; m is 1, 2, 3 or 4; n is 1, 2, or 3; and x is 1 or 2; from 1 to 25 wt. % of a melamine polyphosphate, melamine cyanurate, melamine pyrophosphate, and/or melamine phosphate; from greater than zero to 50 wt. % of a glass fiber having a non-circular cross-section; and from 0 to 5 wt. % of an additive selected from the group consisting of a mold release agent, an antioxidant, a thermal stabilizer, a flow promoting additive, a chain extender, a platy filler, and a UV stabilizer, wherein the components have a combined total weight of 100 wt. %.

Also disclosed is a method for the manufacture of the composition, comprising blending the components of the composition.

Further disclosed are articles comprising the composition.

Methods of forming an article comprise shaping by extruding, calendaring, or molding the composition to form the article.

DETAILED DESCRIPTION OF THE INVENTION

Our invention is based on the discovery that it is now possible to make a thermoplastic polyester composition having a combination of desirable flame retardance, comparative tracking index (CTI), and mechanical properties. Our composition comprises a polyester component comprising poly (butylene terephthalate) (PBT), or virgin PBT, derived from monomers; a nitrogen-containing flame retardant selected from the group consisting of at least one of a triazine, a guanidine, a cyanurate, an isocyanurate, and mixtures thereof; a phosphinic acid salt of formula I and/or diphosphinic acid salt of formula II and/or their polymers as described below; and a flat glass reinforcing fiber having a non-circular cross-section. The use of virgin PBT in combination with a specific amount of a metal phosphinate salt, a particular nitrogen-containing flame retardant (melamine polyphosphate, melamine cyanurate, melamine pyrophosphate, and/or melamine phosphate), and a flat glass fiber, provides compositions having excellent flame retardancy for both thick and thin articles, free or substantially free of a halogenated organic flame retardant. The compositions can further have useful mechanical properties, in particular impact strength, tensile properties, and/or heat stability. The compositions can optionally comprise a charring polymer, for example a polyetherimide, to further improve mechanical strength and flame retardance.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated. All cited references are incorporated herein by reference.

For the sake of clarity, the terms terephthalic acid group, isophthalic acid group, butanediol group, ethylene glycol group in formulas have the following meanings. The term "terephthalic acid group" in a composition refers to a divalent 1,4-benzene radical (-1,4-($C_6H_4$)—) remaining after removal of the carboxylic groups from terephthalic acid-. The term "isophthalic acid group" refers to a divalent 1,3-benzene radical (-(-1,3-($C_6H_4$)—) remaining after removal of the carboxylic groups from isophthalic acid. The "butanediol group" refers to a divalent butylene radical (-($C_4H_8$)—) remaining after removal of hydroxyl groups from butanediol. The term "ethylene glycol group" refers to a divalent ethylene radical (-($C_2H_4$)—) remaining after removal of hydroxyl groups from ethylene glycol. With respect to the terms "terephthalic acid group," "isophthalic acid group," "ethylene glycol group," "butane diol group," and "diethylene glycol group" being used in other contexts, e.g., to indicate the weight % of the group in a composition, the term "isophthalic acid group" means the group having the formula (—O(CO)$C_6H_4$(CO)—), the term "terephthalic acid group" means the group having the formula (—O(CO)$C_6H_4$(CO)—), the term diethylene glycol group means the group having the formula (—O($C_2H_4$)O($C_2H_4$)—), the term "butanediol group" means the group having the formula (—O($C_4H_8$)—), and the term "ethylene glycol groups" means the group having formula (—O($C_2H_4$)—).

The composition comprises a polyester component comprising a PBT. The PBT has an intrinsic viscosity of 0.4 to 2.0 deciliters per gram (dL/g), measured in a 60:40 by weight phenol/1,1,2,2-tetrachloroethane mixture at 23° C. The PBT can have a weight average molecular weight of 10,000 to 200,000 Daltons, specifically 50,000 to 150,000 Daltons as measured by gel permeation chromatography (GPC). If PBT that has a weight average molecular weight less of than 10,000 Daltons is used, the mechanical properties of the compositions after molding are unsatisfactory. On the other hand, if the weight average molecular weight is greater than 200,000 Daltons, the moldability decreases. The polyester component can also comprise a mixture of different batches of PBT prepared under different process conditions in order to achieve different intrinsic viscosities and/or weight average molecular weights.

The polyester component can also comprise other polyesters and/or other polymers, in an amount from more than 0 to 30 weight percent (wt. %), based on the total weight of the polymers in the compositions. For example, the thermoplastic compositions can comprise from 1 to 30 weight percent, based on the total weight of the polymers in the composition, of a second polyester, for example a poly(ethylene terephthalate), poly(ethylene naphthalate), poly(1,4-butylene naphthalate), poly(trimethylene terephthalate), poly(1,4-cyclohexanedimethylene 1,4-cyclohexanedicarboxylate), poly(1,4-cyclohexanedimethylene terephthalate), poly(1,4-butylene-co-1,4-but-2-ene diol terephthalate), poly(cyclohexanedimethylene-co-ethylene terephthalate), or a combination comprising at least one of the foregoing polyesters. Alternatively, the thermoplastic compositions can comprise from 1 to 10 weight percent, based on the total weight of the polymers in the composition, of a polycarbonate and/or an aromatic copolyester carbonate.

However, in a specific embodiment, the polyester component of the thermoplastic composition consists of at least 80% by weight of the polyester containing butylene terephthalate moieties In another embodiment, the polyester component comprises only poly(1,4-butylene terephthalate), such that the thermoplastic compositions consist of poly(1,4-butylene terephthalate) and no other polymer resins.

Polyesters can be obtained by interfacial polymerization or melt-process condensation, by solution phase condensation, or by transesterification polymerization wherein, for example, a dialkyl ester such as dimethyl terephthalate can be transesterified with 1,4-butanediol using acid catalysis, to generate poly(1,4-butylene terephthalate). It is possible to prepare a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

A catalyst component facilitates the reaction, and can be selected from antimony compounds, tin compounds, titanium compounds, combinations thereof as well as many other metal catalysts and combinations of metal catalysts that have been disclosed in the literature. The amount of the catalyst will vary depending on the specific need at hand Suitable amounts of the catalyst range from 1 to 5000 ppm, or more.

The polyester component comprising the PBT can be present in the composition in an amount from 20 to 90 weight percent, based on the total weight of the composition. Within this range, it is preferred to use at least 25 weight percent, even more specifically at least 30 weight percent of the polyester component. In one embodiment, the polyester component is present in an amount from 20 to 80 weight percent, based on the total weight of the composition, specifically from 35 to 75 weight percent, even more specifically from 40 to 75 weight percent, each based on the total weight of the composition.

The composition includes a flame retarding quantity of one or a mixture of nitrogen-containing flame retardants such as triazines, guanidines, cyanurates, and isocyanurates. Preferred triazines have the formula:

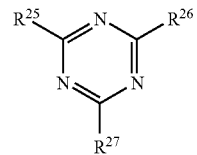

wherein $R^{25}$, $R^{26}$, and $R^{27}$ are independently $C_1$-$C_{12}$ alkyl, $C_1$-$C_{12}$ alkoxy, $C_6$-$C_{12}$ aryl, amino, $C_1$-$C_{12}$ alkyl-substituted amino, or hydrogen. Highly preferred triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid can be used in the composition. Examples include melamine pyrophosphate and melamine polyphosphate (CAS Reg. No. 218768-84-4). Preferred cyanurate/isocyanurate compounds include salts/adducts of the triazine compounds with cyanuric acid, such as melamine cyanurate and any mixtures of melamine salts.

Preferred guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame retardant can be present in the composition at 1 to 25 weight percent, based on the total weight of the composition. Within this range, it is preferred to use at least 5 weight percent, even more specifically at least 8 weight percent of the nitrogen-containing flame retardant. Also within this range, it is preferred to use up to 20 weight percent.

In a specific embodiment, it has been found advantageous to use from 1 to 25 wt. % of a melamine polyphosphate, melamine cyanurate, melamine pyrophosphate, and/or melamine phosphate, based on the total weight of the composition. Particularly good results are obtained using from 1 to 25 wt. % of a melamine polyphosphate and/or melamine cyanurate, specifically 8 to 20 wt. % of melamine polyphosphate and/or melamine cyanurate, based on the total weight of the composition.

The nitrogen-containing flame-retardants are used in combination with one or more phosphinic acid salts. The phosphinates and diphosphinates include those set forth in U.S. Pat. No. 6,255,371 to Schosser, et al. The specification of this patent, column 1, line 46 to column 3 line 4 is incorporated by reference into the present specification. Specific phosphinates mentioned include aluminum diethylphosphinate (DEPAL), and zinc diethylphosphinate (DEPZN). The phosphinates have the formula (I) $[(R^1)(R^2)(PO)—O]_m^- M^{m+}$ and formula II $[(O—POR^1)(R^3)(POR^2—O)]^{2-}_n M^{m+}_x$, and/or polymers comprising such formula I or II, wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or boron; m is 1, 2, 3 or 4; n is 1, 2, or 3; and x is 1 or 2. In one embodiment $R^1$ and $R^2$ are the same and are $C_1$-$C_6$-alkyl, linear or branched, or phenyl; $R^3$ is $C_1$-$C_{10}$-alkylene, linear or branched, $C_6$-$C_{10}$-arylene, -alkylarylene or -arylalkylene; M is magnesium, calcium, aluminum, zinc, or a combination thereof; m is 1, 2 or 3; n is 1, 2 or 3; and x is 1 or 2. The structures of formula I and II are specifically incorporated by reference from the Schosser patent into the present application. Note that $R^1$ and $R^2$ can be H, in addition to the substituents referred to set forth in the patent. This results in a hypophosphite, a subset of phosphinate, such as calcium hypophosphite, aluminum hypophosphite, and the like.

In a specific embodiment M is aluminum, and the composition comprises from 5 to 35 wt. %, specifically from 7 to 20 wt. % of a flame retardant phosphinate of the formula (Ia)

$[(R^1)(R^2)(PO)—O]^-_3 Al^{3+}$ (Ia), a flame retardant diphosphinate of the formula (IIa)

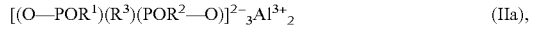

$[(O—POR^1)(R^3)(POR^2—O)]^{2-}_3 Al^{3+}_2$ (IIa), and/or a flame retardant polymer comprising formula (Ia) or (IIa), wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene.

The molding composition also comprises from greater than zero to 50 wt. %, based on the weight of the entire composition, of a reinforcing fiber having a non-circular cross-section. Any rigid fiber can be used, for example, glass fibers, carbon fibers, metal fibers, ceramic fibers or whiskers, and the like. In particular, flat glass fibers are employed in an amount from can 10 wt. % to can 40 wt. %, or can 10 wt. % to can 25 wt. % based on the weight of the entire composition. Preferred flat glass fibers of the invention typically have a modulus of greater than or equal to can 6,800 megaPascals (MPa), and can be chopped or continuous. The flat glass fiber can have various cross-sections, for example, trapezoidal, rectangular, or square.

In preparing the molding compositions it is convenient to use a glass fiber in the form of chopped strands having an average length of from 0.1 mm to 10 mm, and having an average aspect ratio of 2 to 5. In articles molded from the compositions on the other hand shorter lengths will typically be encountered because during compounding considerable fragmentation can occur.

In some applications it can be desirable to treat the surface of the fiber with a chemical coupling agent to improve adhesion to a thermoplastic resin in the composition. Examples of useful coupling agents are alkoxy silanes and alkoxy zirconates Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts. In one embodiment, no round glass fibers are present in the compositions. In another embodiment, only a flat glass fiber is present as a filler component.

The compositions of the invention can additionally comprise a non-fibrous inorganic filler, which can impart additional beneficial properties to the compositions such as thermal stability, increased density, stiffness, and/or texture. Typical non-fibrous inorganic fillers include, but are not limited to, alumina, amorphous silica, alumino silicates, mica, clay, talc, glass flake, glass microspheres, metal oxides such as titanium dioxide, zinc sulfide, ground quartz, and the like. In various embodiments, the amount of non-fibrous filler can be in a range of between 0 wt. % and 50 wt. % based on the weight of the entire composition.

In some embodiments of the invention combinations of glass fibers, carbon fibers or ceramic fibers with a flat, plate-like filler, for example mica or flaked glass, can give enhanced properties. Typically, the flat, plate-like filler has a length and width at least ten times greater than its thickness, where the thickness is from 1 to can 1000 microns. Combinations of rigid fibrous fillers with flat, plate-like fillers can reduce warp of the molded article.

The molding composition can optionally comprise a charring polymer. A charring polymer is a polymer that has not more than 85% weight loss at 400° C. to 500° C. upon heating under nitrogen using a thermogravimetric analysis (TGA) at a heating rate of 20° C. per minute. Typical charring polymers include polyetherimides, poly(phenylene ether), poly(phenylenesulfide), polysulphones, polyethersulphones, poly(phenylenesulphide oxide) (PPSO), and polyphenolics (e.g., novolacs). The charring polymer can be present in an amount from 0.1 to 15 percent by weight of the composition. In a specific embodiment, a polyetherimide is used, specifically an aromatic polyetherimide. When present, the polyetherimide can be present in an amount from more than 0 to 25 wt. %, specifically 0.1 to 25 wt. %, even more specifically from 2 to 8 wt. %, each based on the total weight of the composition.

The presence of a polyetherimide in compositions comprising aluminum phosphinate salts can further improve the mechanical properties of the compositions, in particular tensile strength and impact properties. High temperature molding stability can also be further improved, as well as melt stability. In one embodiment, the compositions contain less than 10 wt % of a polyetherimide, based on the total weight of the composition. In a unique advantage of the current compositions, high CTI and improved mechanical properties are obtained when the composition comprises no charring polymer, in particular no polyetherimide.

The composition can further comprise one or more anti-dripping agents, which prevent or retard the resin from dripping while the resin is subjected to burning conditions. Specific examples of such agents include silicone oils, silica (which also serves as a reinforcing filler), asbestos, and fibrillating-type fluorine-containing polymers. Examples of fluorine-containing polymers include fluorinated polyolefins such as poly(tetrafluoroethylene), tetrafluoroethylene/hexafluoropropylene copolymers, tetrafluoroethylene/ethylene copolymers, poly(vinylidene fluoride), poly(chlorotrifluoroethylene), and the like, and mixtures comprising at least one of the foregoing anti-dripping agents. A preferred anti-dripping agent is poly(tetrafluoroethylene) encapsulated by a styrene-acrylonitrile (SAN) copolymer. When used, an anti-dripping agent is present in an amount of 0.02 to 2 weight percent, and more specifically from 0.05 to 1 weight percent, based on the total weight of the composition.

With the proviso that flame retardance properties, CTI, and mechanical properties such as impact strength, tensile modulus and flexural modulus are not adversely affected, the compositions can, optionally, further comprise other conventional additives used in polyester polymer compositions such as non-reinforcing fillers, stabilizers such as antioxidants, thermal stabilizers, radiation stabilizers, and ultraviolet light absorbing additives, mold release agents, plasticizers, quenchers, lubricants, antistatic agents and processing aids. Other ingredients, such as dyes, pigments, laser marking additives, and the like can be added for their conventionally employed purposes. A combination comprising one or more of the foregoing or other additives can be used.

In an advantageous feature, the composition possesses good flame retardancy substantially in the absence of a halogenated, in particular a chlorinated and/or brominated organic flame retardant compound. In one embodiment, the compositions comprise from more than 0 to less than 5 wt. % halogen, more specifically of a chlorinated and/or brominated organic compound. In another embodiment, the compositions comprise more than 0 to less than 2 wt. % halogen, more specifically of a chlorinated and/or brominated organic compound. In still another embodiment, the compositions comprise less than 900 ppm, less than 500 ppm, or less than 100 ppm of a halogen selected from the group consisting of bromine, chlorine, and combinations thereof.

Where it is important to make compositions having a light grey or a white appearance, a composition can further include a mixture of zinc sulfide and zinc oxide in sufficient amounts to produce a composition having a light grey appearance or a white appearance. The specific amounts of mixtures of zinc sulfide and zinc oxide can vary, depending on the application. In one embodiment, the zinc sulfide is present in an amount that is at least 3 weight percent, based on the total weight of the composition. In another embodiment, the zinc oxide is present in an amount that is at least 0.05 weight percent, based on the total weight of the composition. In another embodiment, the zinc sulfide is present in an amount ranging from 3 to 14 weight percent, based on the total weight of the composition. In another embodiment, the zinc oxide is present in an amount ranging from 0.05 to 14 weight percent, based on the total weight of the composition. The light grey or white composition can have LAB values that can vary. As further discussed below, the use of the mixture of zinc sulfide and zinc oxide produces a material of light gray or white appearance that does not emit an unpleasant odor that results from the formation of hydrogen sulfide. Other colors will be apparent to one of ordinary skill in the art.

The compositions can be prepared by blending the components of the composition, employing a number of procedures. In an exemplary process, the polyester component, phosphorous flame retardant, melamine component, glass fiber, and optional additives are put into an extrusion compounder with resinous components to produce molding pellets. The resins and other ingredients are dispersed in a matrix of the resin in the process. In another procedure, the ingredients and any reinforcing glass are mixed with the resins by dry blending, and then fluxed on a mill and comminuted, or extruded and chopped. The composition and any optional ingredients can also be mixed and directly molded, e.g., by injection or transfer molding techniques. Specifically, all of the ingredients are freed from as much water as possible. In addition, compounding should be carried out to ensure that the residence time in the machine is short; the temperature is carefully controlled; the friction heat is utilized; and an intimate blend between the resin composition and any other ingredients is obtained.

Specifically, the ingredients are pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin-screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions, such as a Newbury or van Dorn type injection-molding machine with conventional cylinder temperatures, at 230° C. to 280° C., and conventional mold temperatures at 55° C. to 95° C. The molded compositions provide an excellent balance of CTI, impact strength, and flame retardancy.

In embodiments where the compositions are of a light grey or a white color, a composition can be made by a method that includes a method for the manufacture of a composition, which comprises blending the components of the composition and further includes that step of adding a mixture of zinc sulfide and zinc oxide in sufficient amounts (i) to produce a composition having a light grey or white appearance and (ii) to inhibit formation of hydrogen sulfide. Hydrogen sulfide emits an highly undesirable odor and inhibiting the formation of such gas makes the use of such a material highly useful. In one embodiment, the zinc sulfide is present in an amount ranging from 3 to 14 weight percent, based on the total weight of the composition. In another embodiment, the zinc oxide is present in an amount ranging from 0.05 to 14 weight percent, based on the total weight of the composition.

In particular, the compositions provide excellent flame retardancy when molded into either thick or thin components. One set of test conditions commonly accepted and used as a standard for flame retardancy is set forth in Underwriters Laboratories, Inc. Bulletin 94, which prescribes certain conditions by which materials are rated for self-extinguishing characteristics. Another set of conditions commonly accepted and used (especially in Europe) as a standard for flame retardancy is the Glow Wire Ignition Test (GWIT), performed according to the International standard IEC 695-2-1/2. A 0.8 mm thick molded sample comprising the composition can have a UL-94 flammability rating of V0. A 0.4 mm thick molded sample comprising the composition can also have a UL-94 flammability rating of V0.

A molded article comprising the composition has a comparative tracking index of more than 350 volts, and more particularly the comparative tracking index is from 350 volts to 600 volts, in accordance with ASTM D3638-85, UL746A, or IEC-112, 3rd publication.

A molded article comprising the composition has a melting viscosity of from 200 to 400 Pa·s, measured in accordance with ISO11443 at 250° C. and 645 1/s. The melting viscosity can be at least 5% lower than for the same composition having the same amount of circular glass fibers, each measured at 250° C. in accordance with ISO11443.

A molded article comprising the composition can have a flexural modulus of from 3000 MPa to 20,000 MPa, measured in accordance with ASTM 790, and the flexular stress at break can be from 120 to 200 MPa, more specifically 130 to 190 MPa, measured in accordance with ASTM 790.

A molded article comprising the composition can have good impact properties, for example, an unnotched Izod impact strength from to 400 to 600 J/m, measured at 23° C. in accordance with ASTM D256. The unnotched Izod impact strength can be at least 20% higher than for the same composition having the same amount of circular glass fibers, each measured at 23° C. in accordance with ASTM D256.

A molded article comprising the composition can have a notched Izod impact strength from 60 to 75 J/m, measured at 23° C. in accordance with ASTM D256. The notched Izod impact strength can be at least 20% higher than for the same composition having the same amount of circular glass fibers, each measured at 23° C. in accordance with ASTM D256.

A molded article comprising the composition can have a heat deflection temperature from 200° C. to 220° C., measured in accordance with ASTM D648 at 1.8 MPa.

The composition can further have good tensile properties. A molded article comprising the composition can have a tensile modulus of elasticity from 2000 MPa to 15000 MPa, measured in accordance with ASTM 790. A molded article comprising the composition can have a tensile elongation at break from 1 to 3%, measured in accordance with ASTM 790. A molded article comprising the composition can have a tensile stress at break from to 80 to 150 MPa, measured in accordance with ASTM 790. The tensile stress at break is at least 10% higher than the same composition having the same amount of circular glass fibers, each measured in accordance with ASTM 790.

In a specific embodiment, the compositions can have a combination of highly useful physical properties. For example, a molded article comprising the composition can have an unnotched Izod impact strength of equal to 400 to 600 J/m, and a notched Izod impact strength at least 20% higher than the same composition having the same amount of circular glass fibers, each measured at 23° C. in accordance with ASTM D256; and a 0.8 mm thick molded sample comprising the composition can have a UL-94 flammability rating of V0. In another specific embodiment, a molded article comprising the composition can have an unnotched Izod impact strength of equal to 400 to 600 J/m, and a notched Izod impact strength from 60 to 75 J/m, each measured at 23° C. in accordance with ASTM D256; and a 0.8 mm thick molded sample comprising the composition can have a UL-94 flammability rating of V0. A molded article comprising the composition has a comparative tracking index of more than 350 volts, and more particularly the comparative tracking index is from 350 volts to 600 volts, in accordance with ASTM D3638-85, UL746A, or IEC-112, 3rd publication.

One or more of the foregoing properties can be achieved by a composition that consists essentially of a poly(1,4-butylene terephthalate); a flame retardant phosphinate of the formula (Ia), (IIa), and/or a flame retardant polymer derived from formula (Ia) or (IIa); melamine polyphosphate and/or melamine cyanurate; a reinforcing flat glass fiber filler having a non-circular cross-section; and an optional additive selected from the group consisting of a mold release agent, an antioxidant, a thermal stabilizer, an antioxidant, and a UV stabilizer. In particular, the foregoing composition achieves good flame retardancy for samples having a thickness of 0.4 and 0.8 mm, and good impact and tensile strength. Better high temperature molding stability and melt stability are also seen. More specifically, one or more of the foregoing properties can be obtained when the polyester component consists of poly(1,4-butylene terephthalate).

In an even more specific embodiment, the composition consists essentially of, based on the total weight of the composition: from 20 to 90 wt. % of a polyester component comprising a poly(butylene terephthalate); from 5 to 35 wt. % of a flame retardant phosphinate of the formula (Ia)

a flame retardant diphosphinate of the formula (IIa)

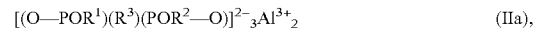

and/or a flame retardant polymer derived from formula (Ia) or (IIa), wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene; from 1 to 25 wt. % of melamine polyphosphate and/or melamine cyanurate; from 1 to 55 wt. % of a glass fiber having a flat cross-section; and from 0 to 5 wt. % of an additive selected from the group consisting of a mold release agent, an antioxidant, a thermal stabilizer, an antioxidant, and a UV stabilizer; wherein the components have a combined total weight of 100 wt. %, and wherein a molded sample comprising the composition has a comparative tracking index ranging from 350 volts to 600 volts in accordance with ASTM D3638-85, UL746A, or IEC-112 $3^{rd}$ publication, and a 0.8 mm thick molded sample comprising the composition has a UL-94 flammability rating of V0.

In a still more specific embodiment, the composition consists essentially of, based on the total weight of the composition: from 20 to 90 wt. % of a polyester component comprising a poly(butylene terephthalate); from 5 to 25 wt. % of a flame retardant phosphinate of the formula (Ia)

a flame retardant diphosphinate of the formula (IIa)

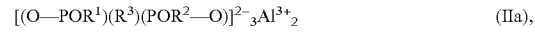

and/or a flame retardant polymer derived from formula (I) or (II), wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene; from 2 to 15 wt. % of melamine polyphosphate and/or melamine cyanurate; from 1 to 45 wt. % of a glass fiber having a flat cross-section; and from 0 to 5 wt. % of an additive selected from the group consisting of a mold release agent, an antioxidant, a thermal stabilizer, an antioxidant, and a UV stabilizer; wherein the components and have a combined total weight of 100 wt. %; and wherein a molded sample comprising the composition has a comparative tracking index ranging from 350 volts to 600 volts in accordance with ASTM D3638-85, UL746A, or IEC-112 $3^{rd}$ publication, and a 0.8 mm thick molded sample comprising the composition has a UL-94 flammability rating of V0.

Also disclosed are molded articles comprising the composition, such as electric and electronic parts, including, for example, connectors, circuit breakers, lamp holders, fusers, power distribution box, enclosures, and power plugs. A method of forming an article comprises shaping by extruding, calendaring, or molding the composition to form the article. Injection molded articles are specifically mentioned, for example an injection molded connector. Other articles include fans, e.g., fans used in electronic devices such as computers.

Advantageously, our invention now provides previously unavailable benefits. Our invention provides thermoplastic polyesters composition having a combination of desirable flame retardance, comparative tracking index (CTI), and mechanical properties. Our compositions can further have useful mechanical properties, in particular impact strength, tensile properties, and/or heat stability. The compositions can optionally comprise a charring polymer, for example, a polyetherimide, to further improve mechanical strength and flame retardance. Such materials have many applications in the electronics industry.

The invention is further illustrated by the following non-limiting examples.

EXAMPLES

The materials in Table 1 were used in the examples that follow.

The ingredients as shown in Tables 2 and 3 were tumble blended and then extruded on a 27 mm twin screw extruder with a vacuum vented mixing screw, at a barrel and die head temperature between 240° C. and 265° C. and a screw speed of 300 rpm. The extrudate was cooled through a water bath prior to pelletizing. ASTM Izod and flexural bars were injection molded on a van Dorn molding machine with a set temperature of approximately 240° C. to 265° C. The pellets were dried for 3 hours to 4 hours at 120° C. in a forced air-circulating oven prior to injection molding.

Notched and unnotched Izod testing was performed on 50 mm×12.5 mm×3.2 mm bars in accordance with ASTM D256. Bars were notched prior to mechanical property testing and were tested at 23° C.

Flexural properties were measured in accordance with ASTM 790 on molded samples having a thickness of 3.2 mm.

Tensile properties were measured in accordance with ASTM D 638 on molded samples having a thickness of 3.2 mm.

Heat deflection temperature was measured on molded samples having a thickness of 3.2 mm in accordance with ASTM D 648.

Melt viscosity was measured in accordance with ISO11443 at 250° C.

Warpage was measured on molded samples having a thickness of 1.6 mm in accordance with the following method: (a) Place the specimen on a flat surface with the knockout pin or cavity dimension side up; (b) Hold the calibrated steel ruler in a vertical position behind the specimen; (c) While watching the ruler, press around the edge of the specimen and identify the maximum distance from the flat surface. This is the warp of the specimen; (d) Measure and record the specimen's warp to the nearest millimeter. Shrinkage was measured on molded samples having a thickness of 1.6 mm in accordance with the following method: Calculate the % reduction in the diameter of a molded 4" disk>48 hrs after molding as compared to the dimension of the mold cavity.

Comparative tracking index was determined in accordance with ASTM D3638-85, UL746A, or IEC-112, $3^{rd}$ publication on molded samples having a thickness of 3.0 mm.

TABLE 1

| Abbreviation | Description | Source |
|---|---|---|
| PBT 1 | Poly(1,4-butylene terephthalate), intrinsic viscosity = 0.66 dl/g, weight-average molecular weight = 53400 g/mol | SABIC Innovative Plastics Company |
| PBT 2 | Poly(1,4-butylene terephthalate), intrinsic viscosity = 1.10 dl/g, weight-average molecular weight = 110000 g/mol | SABIC Innovative Plastics Company |
| Regular glass | Standard 13 micron PBT glass (Glass fiber with round cross-section) | PPG Industries |
| Flat glass | Glass fiber with 'flat' cross-section: cross section area equal to a round glass fiber with a diameter of 14 micron. Flat ratio = 4; fiber length = 3 mm | Nitto Boseki |
| Melamine polyphosphate | Melamine polyphosphate | Ciba Specialty |
| Aluminum diethyl phosphinic acid | Aluminum diethyl phosphinic acid | Clariant |
| Polyetherimide | ULTEM 1010 polyetherimide (PEI) | SABIC Innovative Plastics Company |
| Brominated FR master batch | Brominated flame retardant, masterbatched | SABIC Innovative Plastics Company |
| TSAN | SAN encapsulated PTFE | SABIC Innovative Plastics Company |
| Hindered phenol stabilizer | Hindered phenol stabilizer | Ciba Specialty |
| PETS | Pentaerythritol tetrastearate | Faci SpA |
| Zinc Phosphate | Zinc Phosphate | Halox Pigments |
| Ultratalc | Ultratalc | Barretts Minerals, Inc. |

Examples 1-13

Examples 1-4

The purpose of these examples was to compare the performance of compositions of our invention containing flat glass fiber to compositions containing regular glass fibers (fibers containing a circular cross section). The composition used in Example E1 exemplified an embodiment of our invention while compositions in Examples E2, E3, and E4 were used for comparison.

The compositions were made in accordance to the procedure described above. Results are shown in Table 2.

The effects of flat glass fiber on mechanical properties and CTI ratings could be seen clearly from the comparison among the 4 examples. In non-halogenated FR formulations alone, by replacing regular glass (E3 and E4) with flat glass (E1), mechanical properties including notched and un-notched impact strength, tensile strength, flexural strength & modulus, and HDT were improved by between 5 to 30%. Dimensional stability was also improved by close to 30% with presence of flat glass fiber in the formulation (E1). Flat glass containing non-halogenated FR formula (E1) shows improvement in CTI ratings by one performance level, from Performance Level Category (PLC) 1 (475V for E3 and 375V

TABLE 2

Formulation and Properties of 30% Glass Filled Polyesters

| | Unit | E1 Non-halogenated FR; 30% flat glass; no PEI | E2 Comparative Halogenated FR; 30% regular glass | E3 Comparative Non-halogenated FR; 30% regular glass; no PEI | E4 Comparative Non-halogenated FR; 30% regular glass; w. PEI |
|---|---|---|---|---|---|
| Item | | | | | |
| PBT 1 | % | 51.65 | 52.46 | 51.65 | 46.65 |
| Regular glass | % | | 30 | 30 | 30 |
| Flat glass | % | 30 | | | |
| Melamine polyphosphate | % | 5 | | 5 | 5 |
| Aluminum diethyl phosphinic acid | % | 12.5 | | 12.5 | 12.5 |
| Polyetherimide | % | — | — | — | 5 |
| Brominated FR masterbatch | % | — | 15.45 | — | — |
| TSAN | % | 0.5 | 1.05 | 0.5 | 0.5 |
| Hindered phenol stabilizer | % | 0.15 | 0.04 | 0.15 | 0.15 |
| PETS | % | 0.2 | 0.2 | 0.2 | 0.2 |
| Zinc phosphate | % | | 0.3 | | |
| Ultratalc | % | | 0.5 | | |
| Total | | 100 | 100 | 100 | 100 |
| Properties | | | | | |
| Notched Impact Strength | J/m | 72.6 | 62 | 57.3 | 54.8 |
| Un-notched Impact Strength | J/m | 547 | 608 | 527 | 402 |
| Tensile Stress at Break | MPa | 105 | 116 | 94.1 | 88.1 |
| Flexural Modulus | MPa | 10600 | 9290 | 9980 | 10000 |
| Flexural Stress at Break | MPa | 178 | 186 | 166 | 158 |
| HDT at 1.82 MPa | °C. | 215.6 | 203.3 | 210.6 | 206.4 |
| CTI (100) | V | 600 | 175 | 475 | 375 |
| CTI PLC Rating | | 0 | 3 | 1 | 1 |
| Molding Shrinkage, flow, 3 mm | % | 0.25 | 0.21 | 0.24 | 0.25 |
| Molding Shrinkage, cross-flow, 3 mm | % | 0.49 | 0.81 | 0.74 | — |
| UL-94 at 0.80 mm | | V0 | V0 | V0 | — |

The results shown in Table 2 show that the use of flat glass as a filler, improved the CTI and mechanical properties, as compared to compositions that used regular glass having a circular cross-section.

As shown in Table 2, E2 was 30% regular glass filled halogen FR formulation, E3 was non-halogenated FR, 30% regular glass formulation, E4 was the non-halogenated FR, 30% regular glass and 5% Polyetherimide formulation. E1 was non-halogenated FR, 30% flat glass filled formulation without Polyetherimide.

for E4) to PLC 0 (600V for E1), as compared with both regular glass fiber non-halogenated FR formulas (E3 and E4).

The composition containing flat glass fibers (E1) exhibited many comparable (including tensile strength, un-notched impacted strength, and flexural stress) or improved properties (including notched impacted strength, flexural modulus, and HDT) compared with 30% glass filled halogenated FR formulation (E2). The change in CTI performance levels was even more dramatic between E1 (600V, PLC=0) and E2 since the CTI of E2 was only PLC 3 with 175 V.

Examples 5-9

The purpose of these examples was to compare the performance of compositions of our invention containing flat glass fiber to compositions containing regular glass fibers (fibers containing a circular cross section). Compositions used in Examples E5 and E6 exemplified embodiments of our invention while compositions in Examples E7, E8, and E9 were used for comparison.

The compositions were made in accordance to the procedure described above. Results are shown in Table 3.

tensile strength, and flexural strength were improved by between 5 to 30%. Flat glass fiber containing non-halogenated FR formulas show improvement in CTI ratings by one performance level, from 1 to 0 between E8 (525 V) and E5 (600 V), and from 2 to 1 between E9 (300 V) to E6 (375 V), when round glass fibers were replaced by flat glass fiber, which agrees with the findings from 30% glass filled examples.

Use of flat glass fibers also resulted in the non-halogenated FR formulations (e.g., E5) having comparable properties (such as flexural stress) or improved properties (including

TABLE 3

Formulation and Properties of 25% Glass Filled Polyester Compositions

| Item | Unit | E5 Non-halogenated FR; 25% flat glass; no PEI | E6 Non-halogenated FR; 25% flat glass; PEI | E7 (Comparative) Halogenated FR; 25% regular glass | E8 (Comparative) Non-halogenated FR; 25% regular glass; no PEI | E9 (Comparative) Non-halogenated FR; 25% regular glass; PEI |
|---|---|---|---|---|---|---|
| PBT 1 | % | 56.65 | 51.65 | 57.96 | 56.65 | 51.65 |
| Regular Glass | % | | | 25 | 25 | 25 |
| Flat Glass | % | 25 | 25 | | | |
| Melamine Polyphosphate | % | 5 | 5 | | 5 | 5 |
| Aluminum diethyl Phosphinic acid | % | 12.5 | 12.5 | | 12.5 | 12.5 |
| Polyetherimide | % | | 5 | | | 5 |
| Brominated FR masterbatch | % | | | 15.45 | | |
| TSAN | % | 0.5 | 0.5 | 1.05 | 0.5 | 0.5 |
| Hindered phenol stabilizer | % | 0.15 | 0.15 | 0.04 | 0.15 | 0.15 |
| PETS | % | 0.2 | 0.2 | 0.2 | 0.2 | 0.2 |
| Zinc Phosphate | % | | | 0.3 | | |
| Formulation Total | | 100 | 100 | 100 | 100 | 100 |
| Properties | | | | | | |
| Notched Impact Strength | J/m | 63.3 | 70.8 | 55.5 | 53.5 | 48.9 |
| Tensile Stress at Break | MPa | 97.8 | 97.5 | 87.3 | 87.6 | 98.3 |
| Flexural Modulus | MPa | 8630 | 9290 | 8470 | 8640 | 8900 |
| Flexural stress at break | MPa | 163 | 181 | 174 | 156 | 165 |
| Deflection temp | °C. | 213.3 | 208.9 | 204.5 | 208.8 | 203.2 |
| CTI (100) | V | 600 | 375 | 225 | 525 | 300 |
| CTI PLC Rating | | 0 | 1 | 2 | 1 | 2 |
| Molding Shrinkage, flow, 3 mm | % | — | 0.27 | — | — | 0.26 |
| Molding Shrinkage, x flow, 3 mm | % | — | 0.48 | — | — | 0.72 |
| UL-94 at 0.80 mm | | — | V0 | — | — | V0 |

The results shown in Table 3 show that the use of flat glass as a filler also improved the CTI and mechanical properties, as compared to compositions that used regular glass having a circular cross-section.

As shown in Table 3, E7 was the 25% glass filled halogenated based FR formulation, E8 was non-halogenated FR, 25% regular glass filled formulation. E9 was the non-halogenated FR, 25% regular glass and 5% Polyetherimide filled formulation. E5 and E6 are non-halogenated FR, 25% flat glass filled formulations without and with Polyetherimide, respectively.

In non-halogenated FR formulations, by replacing regular glass fiber (E8 and E9) with flat glass fiber (E5 and E6), mechanical properties including notched impact strength, notched impacted strength, unnotched impacted strength, tensile strength, flexural modulus, and HDT) compared with 25% glass filled halogen-containing FR formulations (E7). The change in CTI rating was by two performance levels between E5 (600 V, PLC=0) and E7 since the CTI rating of E7 was only PLC 2 with 225 V.

As such, molded samples of our composition exhibited a comparative tracking index ranging from 350 volts to 600 volts in accordance with ASTM D3638-85, UL746A, or IEC-112 3rd publication and a 0.8 mm thick molded sample comprising the composition has a UL-94 flammability rating of V0. Compositions used in the comparative examples did not exhibit these properties.

Examples 10-13

The compositions were made in accordance to the procedure described above. Results are shown in Table 4.

TABLE 4

Formulation and Properties of 15% Glass-Filled Polyester Compositions

| Item | Unit | E10 Non-halogenated; 15% flat glass; no PEI | E11 (Comparative) Halogenated; 15% glass; no PEI | E12 (Comparative) Non-halogenated; 15% glass; no PEI | E13 (Comparative) Non-halogenated; 15% glass; PEI |
|---|---|---|---|---|---|
| PBT 1 | % | 66.65 | 67.96 | 66.65 | 61.65 |
| Regular Glass | % | — | 15 | 15 | 15 |
| Flat Glass | % | 15 | — | — | — |
| Melamine Polyphosphate | % | 5 | — | 5 | 5 |
| Aluminum diethyl phosphinic acid | % | 12.5 | — | 12.5 | 12.5 |
| PEI | % | — | — | — | 5 |
| Brominated FR masterbatch | % | — | 15.45 | — | — |
| TSAN | % | 0.5 | 1.05 | 0.5 | 0.5 |
| Hindered phenol stabilizer | % | 0.15 | 0.04 | 0.15 | 0.15 |
| PETS | % | 0.2 | 0.2 | 0.2 | 0.2 |
| Zinc Phosphate | % | | 0.3 | | |
| Formulation Total | | 100 | 100 | 100 | 100 |
| Properties | | | | | |
| Notched Impact Strength | J/m | 70 | 40.5 | 49.5 | 44.7 |
| Un-notched Impact Strength | J/m | 426 | 255 | 373 | 345 |
| Tensile Stress at Break | MPa | 88.8 | 80.9 | 81.6 | 72.5 |
| Flexural Modulus | MPa | 6910 | 5820 | 6780 | 6540 |
| Flexural Stress at break | MPa | 147 | 137 | 134 | 124 |
| Deflection Temp | °C. | 209.5 | 197 | 206.8 | 195.6 |
| CTI (100) | V | 575 | 200 | 575 | 400 |
| CTI PLC Rating | | 0 | 3 | 0 | 1 |

The results shown in Table 4 show that the use of flat glass as a filler improved the CTI and mechanical properties, as compared to compositions that used regular glass having a circular cross-section.

As shown in Table 4, E11 was the 15% glass filled halogen FR formulation, E12 was non-halogenated FR, 15% regular glass filled formulation. E13 was the non-halogenated FR, 15% regular glass and 5% Polyetherimide filled formulation. E10 was non-halogenated FR, 15% flat glass filled formulations without PEI.

When regular glass fiber (E12 and E13) was replaced by flat glass fiber (E10) in non-halogenated FR formulations, some mechanical properties including notched impact strength, tensile strength, and flexural strength were improved by between 10 to 50%. This time, the CTI ratings of E12 and E10 are both PLC=0 (575 V), which can be attributed to the decreasing glass amount in the formulation so that the difference between flat glass and regular glass became less prominent.

Flat glass fiber containing non-halogenated FR formula (E10) also shows equal or better mechanical properties than 15% glass filled halogen FR formulation (E11) in impact strength, tensile strength, flexural modulus, flexural strength, and HDT. E10 shows PLC 0 (575 V) in CTI rating while E11 shows PLC 3 (200 V). As such, molded samples of our composition exhibited a comparative tracking index ranging from 350 volts to 600 volts in accordance with ASTM D3638-85, UL746A, or IEC-112 $3^{rd}$ publication and a 0.8 mm thick molded sample comprising the composition has a UL-94 flammability rating of V0. Compositions used in the comparative examples did not exhibit these properties.

While the invention has been described with reference to a preferred embodiment, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising, based on the total weight of the composition:
   from 20 to 90 wt. % of a polyester component comprising a poly(alkylene terephthalate);
   from 5 to 35 wt. % of
      a flame retardant phosphinate of the formula (I)

a flame retardant diphosphinate of the formula (II)

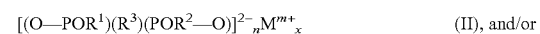

a flame retardant polymer derived from the flame retardant phosphinate of the formula (I) or the flame retardant diphosphinate of the formula (II),
wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or boron; m is 1, 2, 3 or 4; n is 1, 2, or 3; and x is 1 or 2;
from 1 to 25 wt. % of a melamine polyphosphate, melamine cyanurate, melamine pyrophosphate, and/or melamine phosphate;
from 0 to 30 weight percent of other polymers, based on the total weight of polymers in the composition;
from greater than zero to 50 wt. % of a glass fiber having a non-circular cross-section; and
from 0 to 5 wt. % of an additive selected from the group consisting of a mold release agent, an antioxidant, a nucleating agent, a thermal stabilizer, an anti-drip agent, a flow-promoting additive, a chain extender, a platy filler, and a UV stabilizer;
wherein the components have a combined total weight of 100 wt. %;
wherein a molded article comprising the composition has a comparative tracking index that is more than 350 volts in accordance with ASTM D3638-85, UL746A, or IEC-112, $3^{rd}$ publication and a notched impact strength of 60 to 75 J/m, measured at 23° C. in accordance with ASTM D256.

2. The composition of claim 1, further comprising a charring polymer in an amount from 0.1 to 15 percent by weight of the composition, which charring polymer has no more than 85% weight loss at 400° C. to 500° C. upon heating under nitrogen using a thermogravimetric analysis at a heating rate of 20° C. per minute, wherein the charring polymer is polyetherimide, poly(phenylene ether), poly(phenylenesulfide), polysulphone, polyethersulphone, poly(phenylenesulphide oxide), polyphenolic or a combination comprising one of the foregoing charring polymers.

3. The composition of claim 1, wherein a molded article comprising the composition has a comparative tracking index ranging from 350 volts to 600 volts in accordance with ASTM D3638-85, UL746A, or IEC-112 $3^{rd}$ publication.

4. The composition of claim 1, wherein the composition contains more than 0 and less than 2 weight % halogen, based on the total weight of the composition.

5. The composition of claim 1, wherein the composition contains less than 900 ppm of a halogen selected from the group consisting of bromine, chlorine, and combinations thereof.

6. The composition of claim 1, wherein a molded article comprising the composition has an unnotched Izod impact strength of from 400 to 600 J/m, measured at 23° C. in accordance with ASTM D256.

7. The composition of claim 6, wherein a molded article comprising the composition has a notched Izod impact strength of from to 60 to 75 J/m, measured at 23° C. in accordance with ASTM D256.

8. The composition of claim 1, wherein a molded article comprising the composition has a notched Izod impact strength at least 20% higher than the same composition having the same amount of circular glass fibers, each measured at 23° C. in accordance with ASTM D256.

9. The composition of claim 6, wherein a molded article comprising the composition has a notched Izod impact strength at least 20% higher than the same composition having the same amount of circular glass fibers, each measured at 23° C. in accordance with ASTM D256.

10. The composition of claim 1, wherein a molded article comprising the composition has a tensile modulus of elasticity from 2000 MPa to 15000 MPa, measured in accordance with ASTM 790.

11. The composition of claim 1, wherein a molded article comprising the composition has a tensile stress at break from 80 to 150 MPa, measured in accordance with ASTM 790.

12. The composition of claim 1, wherein a molded article comprising the composition has a tensile stress at break at least 10% higher than the same composition having the same amount of circular glass fibers, each measured in accordance with ASTM 790.

13. The composition of claim 1, wherein a molded article comprising the composition has a flexural modulus of 3000 to 20,000 MPa, measured in accordance with ASTM 790.

14. The composition of claim 1, wherein a molded article comprising the composition has a heat deflection temperature of from 200 to 225 ° C., measured in accordance with ASTM D 648 at 1.82 MPa.

15. The composition of claim 1, wherein a 0.8 mm thick molded sample comprising the composition has a UL-94 flammability rating of V0.

16. The composition of claim 1, wherein a 0.4 mm thick molded sample comprising the composition has a UL-94 flammability rating of V0.

17. The composition of claim 1, wherein the polyester component further comprises a polyester selected from the group consisting of poly(ethylene terephthalate), poly(1,4-butylene terephthalate), poly(ethylene naphthalate), poly(1,4-butylene naphthalate), (polytrimethylene terephthalate), poly(1,4-cyclohexanedimethylene 1,4-cyclohexanedicarboxylate), poly(1,4-cyclohexanedimethylene terephthalate), poly(1,4-butylene-co-1,4-but-2-ene diol terephthalate), poly(cyclohexanedimethylene-co-ethylene terephthalate), and a combination thereof.

18. The composition of claim 1, wherein the polyester component comprises poly(1,4-butylene terephthalate).

19. The composition of claim 1, wherein the glass fiber has a trapezoidal cross section.

20. The composition of claim 1, wherein the glass fiber has a rectangular cross-section.

21. The composition of claim 1, wherein the glass fiber has a square cross-section.

22. The composition of claim 1, wherein the glass fiber has an average aspect ratio of 2 to 5.

23. The composition of claim 1, wherein the glass fibers have an average length of 0.1 mm to 10 mm.

24. The composition of claim 1, wherein M is selected from the group consisting of magnesium, calcium, aluminum, zinc, and a combination thereof.

25. The composition of claim 1, wherein M is aluminum.

26. The composition of claim 1, wherein the flame retardant phosphinate of the formula (I) or of the formula (II) comprises an aluminum phosphinate.

27. The composition of claim 1, wherein the composition comprises no polyetherimide.

28. The composition of claim 1, wherein the composition comprises more than 0 to less than 10 wt % of a polyetherimide, based on the total weight of the composition.

29. The composition of claim 1, wherein the antidripping agent comprises poly(tetrafluoro ethylene) encapsulated by a styrene-acrylonitrile copolymer.

30. The composition of claim 1, wherein the composition further comprises an additive selected from the group consisting of a lubricant, a quencher, a plasticizer, an antistatic agent, a dye, a pigment, a laser marking additive, a radiation stabilizer, and a combination thereof.

31. The composition of claim 1, wherein the composition comprises from more than 0 to less than 5 wt. % of a chlorinated organic compound and/or a brominated organic compound.

32. A composition consisting essentially of, based on the total weight of the composition:
from 20 to 90 wt. % of a polyester component comprising a poly(butylene terephthalate);
from 5 to 35 wt. % of
a flame retardant phosphinate of the formula (Ia)

a flame retardant diphosphinate of the formula (IIa)

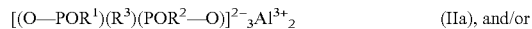

a flame retardant polymer derived from formula (Ia) or (IIa), wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene;

from 1 to 25 wt. % of melamine polyphosphate and/or melamine cyanurate;
from 0 to 30 weight percent of other polymers, based on the total weight of polymers in the composition but wherein the composition comprises no charring polymer;
from 10 to 40 wt. % of a glass fiber having a flat cross-section; and
from 0 to 5 wt. % of an additive selected from the group consisting of a mold release agent, an antioxidant, a thermal stabilizer, an antioxidant, and a UV stabilizer;
wherein the composition contains less than 900 ppm of a halogen selected from the group consisting of bromine, chlorine, and combinations thereof;
wherein the components and have a combined total weight of 100 wt. %, and
wherein a molded sample comprising the composition has a comparative tracking index ranging from 350 volts to 600 volts in accordance with ASTM D3638-85, UL746A, or IEC-112 $3^{rd}$ publication a notched impact strength of 60 to 75 J/m measured at 23° C. in accordance with ASTM D256, and a 0.8 mm thick molded sample comprising the composition has a UL-94 flammability rating of V0.

33. A composition comprising no charring polymer and consisting essentially of, based on the total weight of the composition:
from 20 to 90 wt. % of a polyester component comprising a poly(butylene terephthalate);
from 5 to 25 wt. % of
a flame retardant phosphinate of the formula (Ia)

a flame retardant diphosphinate of the formula (IIa)

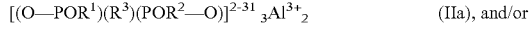

a flame retardant polymer derived from formula (Ia) or (IIa), wherein $R^1$ and $R^2$ are both hydrogen;
from 1 to 15 wt. % of melamine polyphosphate and/or melamine cyanurate;
from 10 to 40 wt. % of a glass fiber having a flat cross-section, an average length of from 0.1 mm to 10 mm, and an average aspect ratio of 2 to 5;
from 0 to 5 wt. % of an additive selected from the group consisting of a mold release agent, an antioxidant, a thermal stabilizer, an antioxidant, and a UV stabilizer; and
less than 900 ppm of a halogen selected from the group consisting of bromine, chlorine, and combinations thereof;
wherein the components have a combined total weight of 100 wt. %; and wherein a molded sample comprising the composition has a comparative tracking index ranging from 575 volts to 600 volts in accordance with ASTM D3638-85, UL746A, or IEC-112 $3^{rd}$ publication, a notched impact strength of 60 to 75 J/m, measured at 23° C. in accordance with ASTM D256, and a 0.8 mm thick molded sample comprising the composition has a UL-94 flammability rating of V0.

34. A method for the manufacture of a composition, comprising blending the components of the composition of claim 1.

35. An article comprising the composition of claim 1.

36. A method of forming an article, comprising shaping by extruding, calendaring, or molding the composition of claim 1 to form the article.

37. The article of claim 35, wherein the article is an injection molded article.

* * * * *